United States Patent
Holt et al.

(10) Patent No.: US 9,380,114 B1
(45) Date of Patent: Jun. 28, 2016

(54) TECHNIQUES FOR PEER MESSAGING ACROSS MULTIPLE STORAGE PROCESSORS OF A DATA STORAGE ARRAY

(71) Applicant: EMC Corporation, Hopkinton, MA (US)

(72) Inventors: James M. Holt, Raleigh, NC (US); Robert F. Goudreau, Cary, NC (US); Karl M. Owen, Chapel Hill, NC (US); Alan L. Taylor, Cary, NC (US); Chung-Huy Chen, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 534 days.

(21) Appl. No.: 13/929,038

(22) Filed: Jun. 27, 2013

(51) Int. Cl.
*G06F 3/06* (2006.01)
*H04L 29/08* (2006.01)

(52) U.S. Cl.
CPC .................................. *H04L 67/1097* (2013.01)

(58) Field of Classification Search
CPC ... G06F 3/0608; G06F 3/0644; G06F 3/0689; G06F 3/0619; G06F 3/065; G06F 3/0673; G06F 3/0655; G06F 12/06; G06F 12/02; G06F 12/0223
USPC .................................................. 709/204, 215
See application file for complete search history.

(56) References Cited

U.S. PATENT DOCUMENTS

| | | | | |
|---|---|---|---|---|
| 8,086,585 | B1 * | 12/2011 | Brashers | ........... G06F 17/30097 707/705 |
| 8,832,024 | B2 | 9/2014 | Knight et al. | |
| 2003/0018606 | A1 * | 1/2003 | Eshel | ...................... H04L 67/42 |
| 2003/0018785 | A1 * | 1/2003 | Eshel | ...................... H04L 12/417 709/226 |
| 2007/0244895 | A1 * | 10/2007 | Mohler | ............. G06F 17/30867 |
| 2007/0244901 | A1 * | 10/2007 | Mohler | ................. G06Q 10/107 |
| 2009/0209314 | A1 * | 8/2009 | Rybak | .................... G06F 21/105 463/20 |
| 2012/0079583 | A1 * | 3/2012 | Christiansen | ........... G06F 3/061 726/9 |
| 2013/0179649 | A1 * | 7/2013 | Green | ................... G06F 3/0611 711/162 |
| 2014/0068213 | A1 * | 3/2014 | Maeda | .................. G06F 3/0608 711/162 |
| 2014/0068233 | A1 * | 3/2014 | Ueda | ....................... G06F 3/061 712/225 |
| 2014/0122434 | A1 * | 5/2014 | Knight | .................. G06F 3/0608 707/645 |
| 2014/0143286 | A1 | 5/2014 | Knight et al. | |

(Continued)

FOREIGN PATENT DOCUMENTS

| | | | | |
|---|---|---|---|---|
| CA | 2810833 | A1 * | 3/2012 | .............. G06F 3/061 |
| CA | 2844312 | A1 * | 2/2013 | .............. H04L 67/06 |
| CN | 102521010 | A | * 6/2012 | .............. G06F 3/062 |

OTHER PUBLICATIONS http://www.quadstor.com/offloaded-data-transfers-odx.html, 2015.*

*Primary Examiner* — Kostas Katsikis
(74) *Attorney, Agent, or Firm* — BainwoodHuang

(57) ABSTRACT

A technique manages peer messaging across multiple SPs of a data storage array. The technique involves using a token, by a first SP of the data storage array, to identify particular data stored at a source storage location on the data storage array. The technique further involves starting, by the first SP, multiple WUT operations which use the token in response to multiple WUT requests, each WUT operation moving the particular data from the source storage location to a respective destination storage location. The technique further involves providing, by the first SP, a single "touch" message in response to starting the multiple WUT operations by the first SP, the single "touch" message informing a set of other SPs of the data storage array that the token which identifies the particular data has been touched.

20 Claims, 10 Drawing Sheets

(56) References Cited

U.S. PATENT DOCUMENTS

| | | | |
|---|---|---|---|
| 2014/0164571 A1* | 6/2014 | Green | H04L 67/1095 709/219 |
| 2014/0172811 A1* | 6/2014 | Green | H04L 67/06 707/705 |
| 2015/0234715 A1 | 8/2015 | Knight et al. | |

* cited by examiner

TECHNIQUES FOR PEER MESSAGING ACROSS MULTIPLE STORAGE PROCESSORS OF A DATA STORAGE ARRAY

BACKGROUND

Offloaded data transfer (ODX) refers to offloading data movement operations from host computers during data transfer operations which copy host data from sources to destinations within a data storage array or between data storage arrays. That is, rather than copy data from a data storage source to a host computer (where the data is buffered), and then from the host computer to a data storage destination, data is copied from the data storage source directly to the data storage destination. Such offloading of data movement operations saves host computer resources (e.g., host computer memory, bandwidth to and from host computers, etc.).

In one conventional approach, a host computer provides a "populate token" (PT) request which identifies, to the data storage array, particular host data for copying. The data storage array returns a token to the host computer in response to the PT request. Thereafter, devices (e.g., data storage arrays, host computers, etc.) are able to identify the particular host data using the token. For example, a host computer can subsequently provide to the data storage array a "write using token" (WUT) request which includes (i) the token and (ii) a data storage destination. The data storage array responds to the WUT request by performing a WUT operation which copies the particular host data from the data storage source directly to the data storage destination without buffering the particular host data on the host computer. Windows ODX is an offloaded data transfer technology which is provided by Microsoft Corporation of Redmond, Wash. and which operates in a manner similar to that described above.

It should be understood that a WUT operation which is in progress can be canceled prior to completion. For example, suppose that a data storage array starts a WUT operation to copy particular host data from the data storage source to the data storage destination. If the particular host data at the data storage source is modified before the WUT operation completes, the data storage array automatically cancels the WUT operation in order to preserve data integrity.

SUMMARY

It should be understood that there are deficiencies to the above-described conventional ODX technology which is capable of simply canceling WUT operations prior to completion. For example, suppose that a storage processor (SP) of a data storage array is configured to expire any tokens that are inactive for more than five seconds from the perspective of that SP in order to reclaim token resources. Further suppose that expiration of a token includes cancelation of any WUT operations in progress that are based on that token. In this situation, a first SP of the data storage array might begin a WUT operation to copy a relatively large file (e.g., a VMDK file for a virtual machine) which takes longer than five seconds to complete. Unfortunately, if a second SP of the data storage array determines that the token has been idle for more than five seconds from the perspective of the second SP and expires the token, the WUT operation in progress on the first SP will be canceled as a result (i.e., the second SP will direct the first SP to cancel the WUT operation before the first SP has enough time to complete the WUT operation). Accordingly, the WUT operation will not successfully complete even though the host data at the data storage source remained intact throughout this time, i.e., the host data was not modified during the WUT operation.

In contrast to the above-described conventional ODX technology in which a WUT operation may not successfully complete even though host data remains intact, an improved technique is directed to managing token states across multiple storage processors (SPs) of a data storage array. Such a technique enables the SPs to smartly coordinate token expiration and WUT operation cancelation for improved efficiency and effectiveness. In particular, when an SP encounters a token which has been idle for more than a predefined expiration time period (e.g., five seconds) from the perspective of that SP, the SP only expires the token if it sees that the token is idle on all other SPs (e.g., via monitoring token states). Such operation enables WUT operations to complete without being canceled even if the WUT operations take longer than the predefined expiration time period.

Moreover, each SP of the data storage array may maintain, for each token, a timestamp to determine whether the predefined amount of time for token expiration has passed. The delta between current time and that timestamp indicates the amount of time since the token state information for that token was last updated, i.e., since the token was last "touched". Accordingly, a comparison of this delta to the predefined amount of time indicates whether the predefined amount of time has passed.

In order for the SPs of the data storage array to maintain synchronized timestamps and thus synchronized token expiration times, the SPs may exchange "touch" messages for tokens in response to WUT operations. In particular, when an SP initiates a WUT operation which uses a particular token, the SP updates its local timestamp for that token and sends a "touch" message for that token to the other SPs.

Furthermore, if multiple simultaneous WUT operations for the same token occur on an SP, the SP needs to send only a single "touch" message (or an update timestamp message) for just one of the simultaneous WUT operations rather than a "touch" message for each WUT operation. Such peer messaging activity not only keeps the token's expiration time synchronized across the SPs, such activity also reduces messaging traffic between SPs and frees SP resources for use in other operations.

One embodiment is directed to a method of peer messaging across multiple SPs of a data storage array. The method includes using a token, by a first SP of the data storage array, to identify particular data stored at a source storage location on the data storage array. The method further includes starting, by the first SP, multiple WUT operations which use the token in response to multiple WUT requests, each WUT operation moving the particular data from the source storage location to a respective destination storage location. The method further includes providing, by the first SP, a single "touch" message in response to starting the multiple WUT operations by the first SP, the single "touch" message informing a set of other SPs of the data storage array that the token which identifies the particular data has been touched.

In some arrangements, starting the multiple WUT operations which use the token in response to the multiple WUT requests includes initiating the multiple WUT operations within a period of time in which the single "touch" message has been queued for output to the set of other SPs by the first SP but not yet outputted by the first SP. Additionally, providing the single "touch" message in response to starting the multiple WUT operations includes, after the period of time, outputting the single "touch" message to the set of other SPs to synchronize token expiration across SPs.

In some arrangements, the method further includes, in response to initiation of a first WUT operation of the multiple WUT operations which use the token, (i) checking whether a "touch" message for the token has been queued for transmission by the first SP and (ii) due to absence of any queued "touch" message for the token, queuing the single "touch" message on behalf of the first WUT operation for transmission by the first SP.

In some arrangements, the method further includes, after queuing the single "touch" message for transmission by the first SP and in response to initiation of a set of other WUT operations of the multiple WUT operations which use the token, (i) checking whether a "touch" message for the token has been queued for transmission by the first SP and (ii) due to presence of the queued single "touch" message, not queuing further "touch" messages on behalf of the set of other WUT operations of the multiple WUT operations which use the token.

In some arrangements, providing the single "touch" message in response to starting the multiple WUT operations includes, after outputting the single "touch" message to the set of other SPs, starting, by the first SP, another WUT operation which uses the token in response to another WUT request to move the particular data from the source storage location to another destination storage location. In these arrangements, providing further includes outputting, by the first SP, another "touch" message in response to starting the other WUT operation, the other "touch" message informing the set of other SPs of the data storage array that the token which identifies the particular data has been touched again.

In some arrangements, the data storage array includes a set of non-volatile data storage units to store host data on behalf of a set of host computers, the host data including the particular data identified using the token. In these arrangements, the method further includes performing, by the first SP and the set of other SPs, host input/output (I/O) operations on the particular data in response to host I/O requests from the set of host computers.

In some arrangements, the method further includes updating, by the first SP, a local timestamp for the token in response to the single "touch" message. Additionally, in some arrangements, the method further includes updating, by the first SP, the local timestamp for the token in response to a "touch" message from a second SP of the data storage system. Furthermore, in some arrangements, the method further includes updating, by each SP of the set of other SPs, a respective timestamp for the token in response to the single "touch" message provided by the first SP in response to starting the multiple WUT operations by the first SP.

Other embodiments are directed to electronic systems and apparatus, processing circuits, computer program products, and so on. Some embodiments are directed to various methods, electronic components and circuitry which are involved in peer messaging across multiple SPs.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to managing token states across multiple storage processors (SPs) of a data storage array. Such techniques enable the SPs to smartly coordinate token expiration and write using token (WUT) operation cancelation for improved efficiency and effectiveness. For example, when a particular SP encounters a token which has been idle for more than a predefined time period for token expiration (e.g., five seconds) from the perspective of that particular SP, the particular SP only expires the token if it sees that the token is idle on all other SPs (e.g., via monitoring token states). Such token state management enables WUT operations to complete without being canceled prematurely if the WUT operations take longer than the predefined time period for token expiration.

Figure 1:
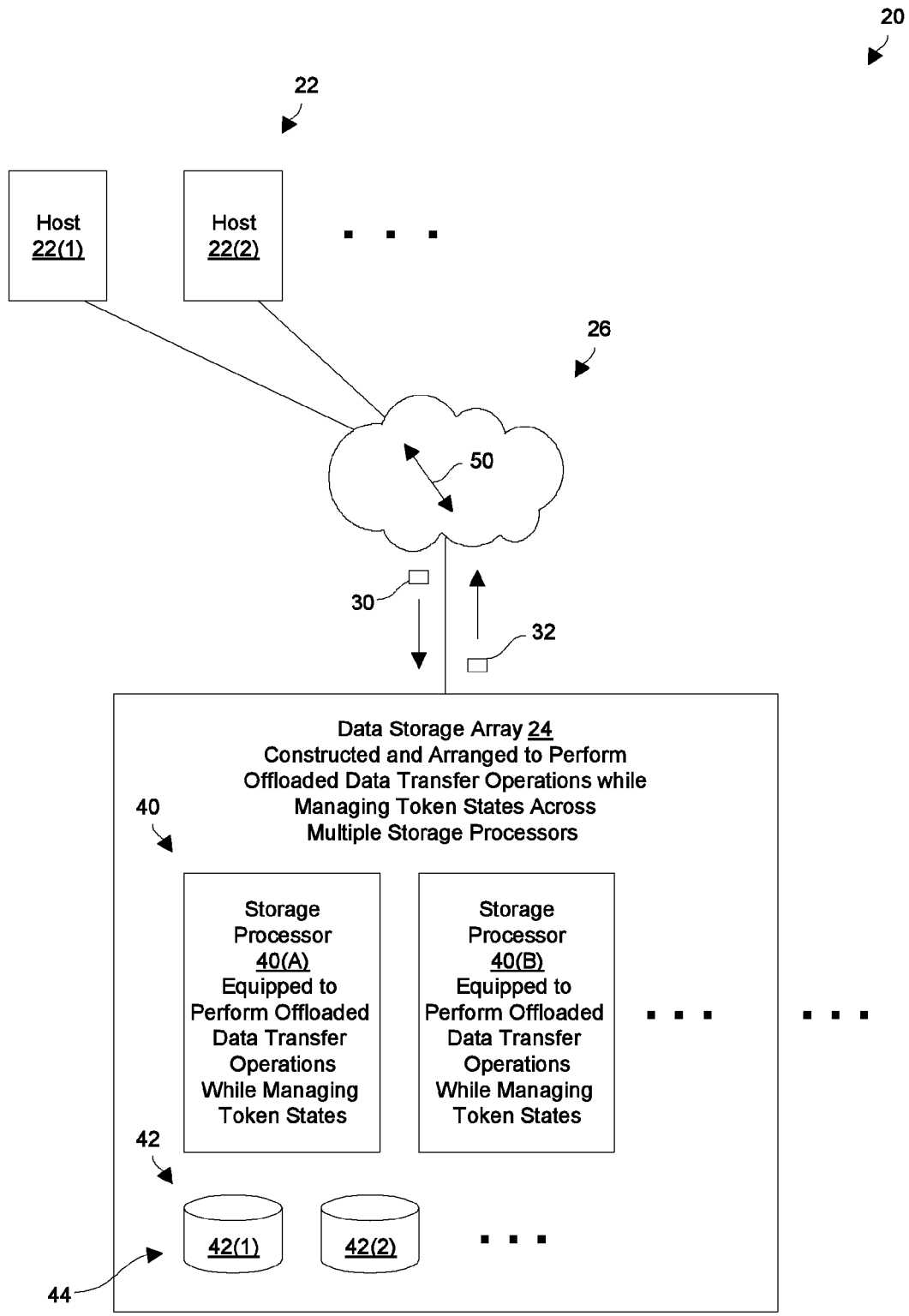
FIG. 1 is a block diagram of a data storage array which manages token states across multiple storage processors (SPs).

FIG. 1 shows an electronic environment 20 which is suitable for use by the improved techniques. The electronic environment 20 includes host computers (or simply hosts) 22(1), 22(2), . . . (collectively, hosts 22), a data storage array 24, and a communications medium 26.

Each host 22 is constructed and arranged to provide host input/output (I/O) requests 30 to the data storage array 24, and receive host I/O responses 32 from the data storage array 24. Suitable host I/O requests 30 include block-based commands such as small computer system interface (SCSI) requests, iSCSI requests, etc. as well as file-based commands.

The data storage array 24 is constructed and arranged to perform load and store operations on behalf of the hosts 22. Along these lines, the data storage array 24 includes storage processors 40(A), 40(B), . . . (collectively, SPs 40), and a set of storage units 42(1), 42(2), . . . (collectively, storage units 42). Suitable storage units include magnetic disk drives, flash drives, and the like, which are capable of storing host data 44 in a fault tolerant, non-volatile manner (e.g., RAID, journaling, etc.). Such storage may be block-based or file-based. In some arrangements, the electronic environment 20 includes multiple data storage arrays 24 (see ellipsis) which are capable of storing host data 44.

The communications medium 26 is constructed and arranged to connect the various components of the electronic environment 20 together to enable these components to exchange electronic signals 50 (e.g., see the double arrow 50).

At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the hosts 22 communicate with the data storage array 24 to access host data 44 stored on the storage units 42 of the data storage array 24. Along these lines, the data storage array 24 performs I/O operations (e.g., write operations, read operations, etc.) in response to the host I/O requests 30 from the hosts 22, and returns host I/O responses 32 reflecting the results of the I/O operations to the hosts 22.

Additionally, the data storage array 24 is capable of performing WUT operations (i.e., token-based offloaded data transfer operations) which involve copying host data 44 from source storage locations to destination storage locations using tokens to identify the host data 44 without the need for the hosts 22 to buffer the host data 44 during transfer. Such WUT operations may be completely internal to the data storage array 24, i.e., the host data 44 may be transferred from one internal location to another internal location within the same data storage array 24. Additionally, other WUT operations may involve transferring host data 44 from one data storage array 24 to another data storage array 24.

To smartly coordinate WUT operations among the SPs 40 of a data storage array 24, each SP 40 maintains a respective set of token states for each token. Additionally, each SP 40 communicates changes in token states from its perspective to all other SPs 40. Accordingly, the SPs 40 are able to monitor the WUT operations of other SPs 40 and avoid canceling WUT operations prematurely and unnecessarily if the WUT operations happen to take longer than a predefined amount of time which is the threshold for declaring that a token has expired. Further details will now be provided with reference to FIG. 2.

Figure 2:
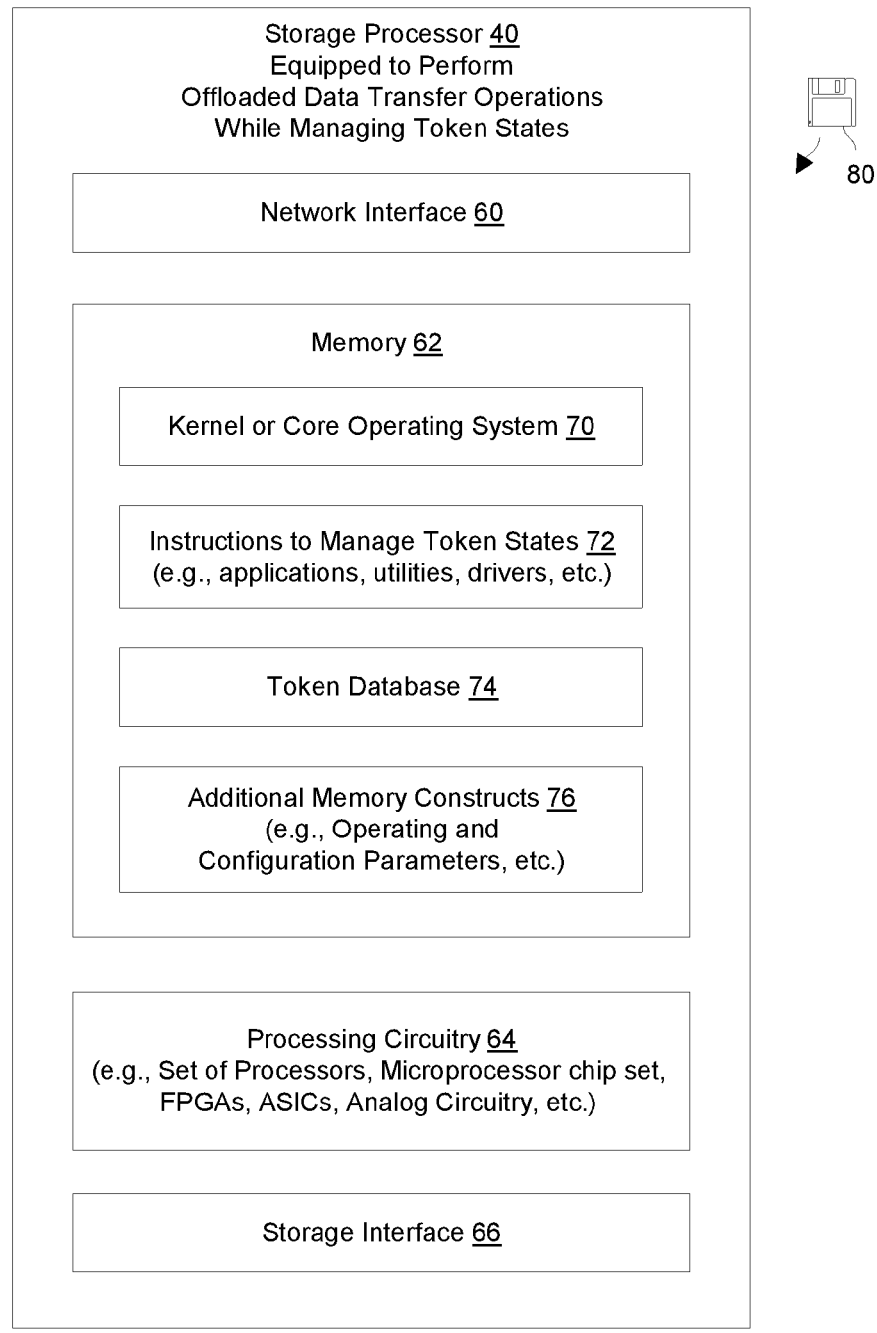
FIG. 2 is a block diagram of an SP of the data storage array of FIG. 1.

FIG. 2 is a block diagram of an SP 40 of the data storage array 24 of FIG. 1. The SP 40 includes a network interface 60, memory 62, processing circuitry 64 and a storage interface 66. It should be understood that each data storage array 24 may include multiple SPs 40 (e.g., two SPs, four SPs, eight SPs, multiple virtual SPs the number of which is dictated by the available computer resources, etc.).

The network interface 60 is constructed and arranged to connect the SP 40 to the communications medium 26 thus enabling the SP 40 to communicate with the other components of the electronic environment 20 (e.g., hosts 22, other data storage arrays 24, etc.). Such communications may be copper-based or wireless (i.e., IP-based, SAN-based, cellular, Bluetooth, combinations thereof, and so on). The network interface 60 may reside on the same circuit board (or blade) as the SP circuitry or have a modular form factor and be external to the SP circuitry.

The memory 62 is intended to represent both volatile storage (e.g., DRAM, SRAM, etc.) and non-volatile storage (e.g., flash memory, magnetic disk drives, etc.). The memory 62 stores a variety of software constructs including a kernel or core operating system 70 to manage computerized SP resources, instructions to manage token states 72 (e.g., a set of specialized applications, utilities, drivers, etc.), a token database 74 which stores token state information for each token, and additional memory constructs 76 (e.g., operating and configuration parameters, etc.).

The processing circuitry 64 is constructed and arranged to operate in accordance with the various software constructs stored in the memory 62. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software to the SP 40. The computer program product 80 has a non-transitory (or non-volatile) computer readable medium which stores a set of instructions which controls one or more operations of the SP 40. Examples of suitable computer readable storage media include tangible articles of manufacture and apparatus which store instructions in a non-volatile manner such as CD-ROM, flash memory, disk memory, tape memory, and the like.

The storage interface 66 is constructed and arranged to connect the storage processor 40 to the set of storage units 42 thus enabling the SP 40 to save host data 44 to the set of storage units 42 and retrieve host data 44 from the set of storage units 42 (also see FIG. 1).

It should be understood that each SP 40 may include additional circuitry and/or components to augment/facilitate operation. For example, each SP 40 may include a specialized port (e.g., a channel or bus) dedicated to communicate with other SPs 40 of the same data storage array 24. Such a port may be considered to be part of one of the interfaces described above (e.g., the network interface 60) or a separate component of the SP 40. Additionally, there are a variety of technologies which are suitable for use for such inter-SP communications, e.g., CLARiiON Messaging Interface (CMI), I$^2$C, and so on. Further details will now be provided with reference to FIG. 3.

Figure 3:
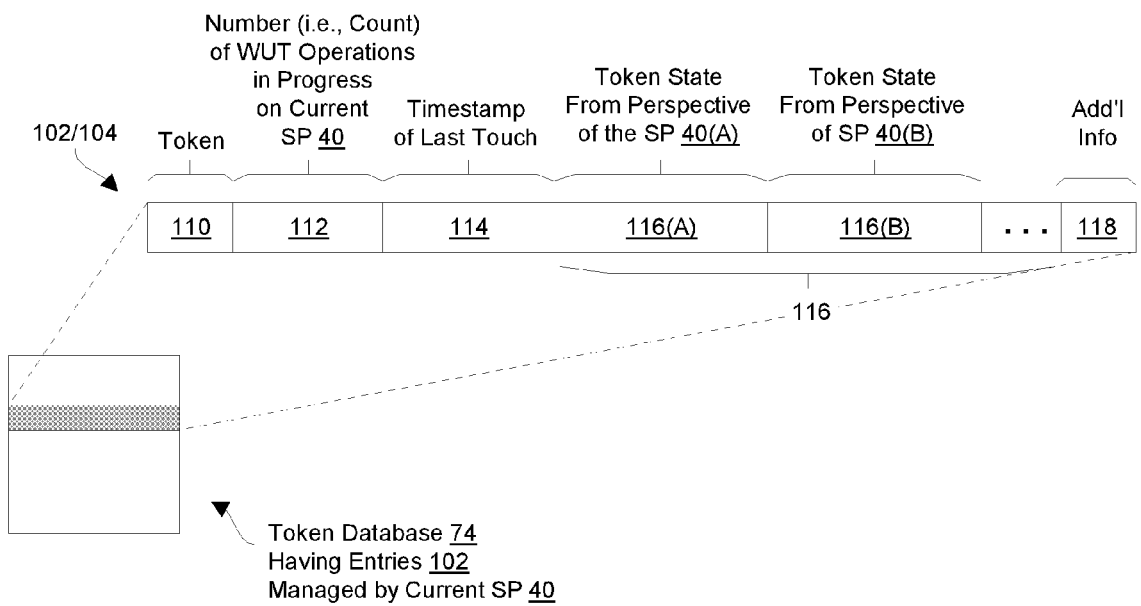
FIG. 3 is a block diagram of a token database of the SP of FIG. 2.

FIG. 3 shows particular details of the token database 74 stored in the memory 62 of each SP 40 (also see FIG. 2). As shown in FIG. 3, each entry 102 of the token database 74 is generally considered to be an SP-controlled set of token state information which corresponds to a particular token and which includes multiple fields 104 containing token-related information. In particular, the format for each entry 102 includes a token field 110 to hold a token identifier which uniquely identifies the particular token, a number (or count) of WUT operations currently in progress field 112 to hold a tally of the WUT operations currently in progress on that SP 40, a timestamp field 114 to hold a timestamp of that last time the particular token was touched, token state fields 116 to hold token states, and additional fields 118 to hold additional data (e.g., see enlarged view in FIG. 3).

In connection with the number of WUT operations currently in progress field 112, the SP 40 increments the contents of this field 112 each time the SP 40 begins a new WUT operation using the particular token. Similarly, the SP 40 decrements the contents of this field 112 each time the SP 40 completes an existing WUT operation which uses the particular token. Accordingly, the contents of the field 112 is essentially a counter indicating how many WUT operations are currently in progress on the SP 40.

In connection with the token state fields 116, it should be understood that the token state fields 116 include a separate state field 116 corresponding to each SP 40 of the data storage array 24. That is, the token state field 116(A) of the entry 102 holds a value indicating a state of the particular token from the perspective of the SP 40(A). Similarly, the token state field 116(B) holds a value indicating a state of the particular token from the perspective of the SP 40(B), and so on.

One possible token state which can be stored in a token state field 116 is the value representing the "busy" token state. The SP 40 considers a particular token to be "busy" if the count of WUT operations currently in progress stored in the field 112 is greater than zero.

Another possible token state which can be stored in a token state field 116 is the "idle" token state. If the current count in the field 112 drops to zero, the SP 40 considers the particular token to be "idle".

For example, if the field 116(A) of an entry 102 stores a token state value of "busy", the corresponding token is "busy" from the perspective of the SP 40(A), i.e., there is at least one WUT operation currently in progress on SP 40(A) using that token. Similarly, if the field 116(A) of that entry 102 stores a token state value of "idle", the corresponding token is "idle" from the perspective of the SP 40(A), i.e., there are no WUT operations currently in progress on SP 40(A) using that token.

Likewise, if the field 116(B) of that entry 102 stores "busy", the corresponding token is "busy" from the perspective of the SP 40(B), i.e., there is at least one WUT operation currently in progress on SP 40(B) using that token. Furthermore, if the field 116(B) of that entry 102 stores "idle", the corresponding token is "idle" from the perspective of the SP 40(B), i.e., there are no WUT operations currently in progress on SP 40(B) using that token.

It should be further understood that the additional fields 118 hold other information regarding the particular token. For example, in some arrangements, the additional fields 118 hold the source and destination storage locations of the data which is identified by the particular token.

At this point, one will appreciate that management of the token database 74 consumes storage processor resources such as memory to store the token database 74, and processor cycles to update the fields 104 of each entry 102 of the token database 74. To make efficient use of the token database 74, the processing circuitry 64 of the SP 40 routinely examines the entries 102 to determine whether any tokens should be expired. In particular, a token should be expired when all of the token states for that token have been "idle" for at least a predefined amount of time for token expiration (e.g., five seconds, 10 seconds, 30 seconds, etc.). In some arrangements, an expiration checker which scans the token database 74 and expires tokens is formed by executing certain instructions 72 on the processing circuitry 64 (also see FIG. 2). Accordingly, SP resources used for managing expired tokens can be reclaimed and reused for other operations.

To determine whether the predefined amount of time for token expiration has passed for each token, a timing mechanism exists for each token which identifies how much time has elapsed since the last time that token was touched from the perspective of that SP 40. In one arrangement, the delta between current time on the SP 40 and the timestamp of a token indicates the amount of time since the token state information for that token was last updated, i.e., since the token was last touched. Accordingly, a comparison of the delta to the predefined amount of time indicates whether the predefined amount of time has passed. In another arrangement, each token has a dedicated timer circuit to monitor how much time has passed since the token was last touched. Other time tracking mechanisms for the tokens are suitable for use as well. Further details will now be provided with reference to FIGS. 4 and 5.

Figure 4:
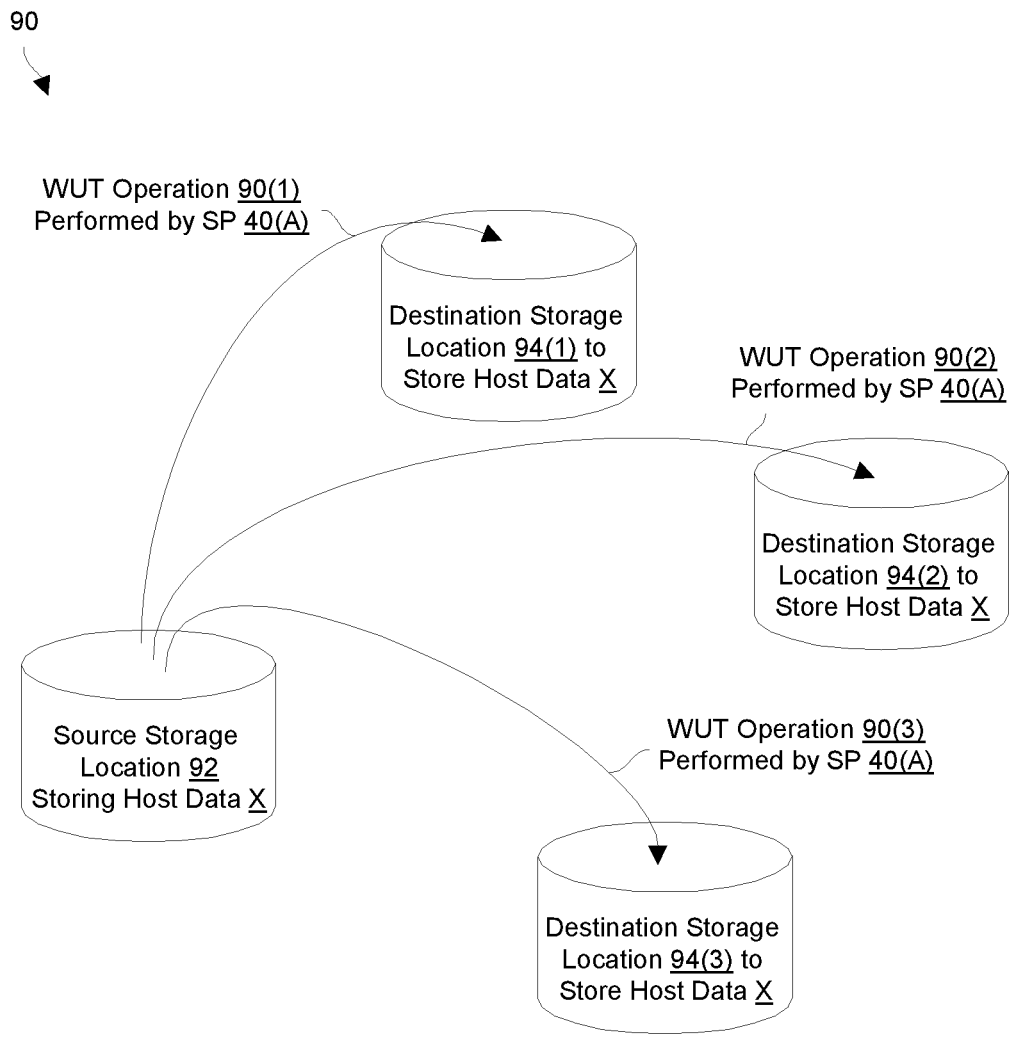
FIG. 4 is a diagram of write using token (WUT) operations in accordance with an example.
Figure 5:
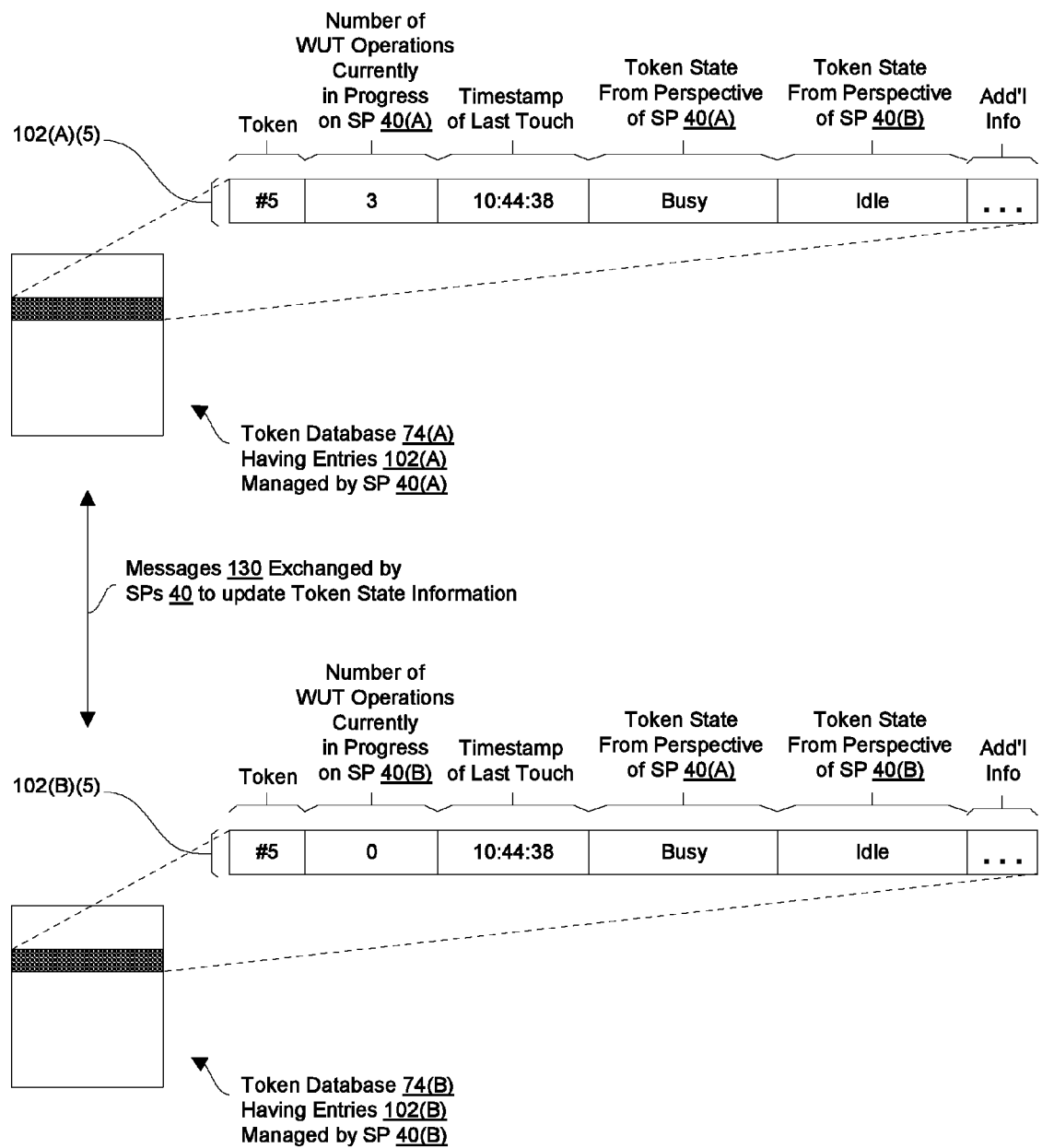
FIG. 5 is a diagram of a token database in accordance with the example.

FIGS. 4 and 5 provide an example as to how SPs 40 manage token states using their respective token databases 74 and via exchanging update messages 130 (see FIG. 5). In this example, the data storage array 24 includes two SPs, i.e., SP 40(A), 40(B). FIG. 4 shows an example set of WUT operations currently in progress by the SP 40(A). FIG. 5 shows example entries of the token databases 74. Such token information sharing enables the SPs 40 to coordinate token expiration and WUT operation cancelation for improved efficiency and effectiveness.

In accordance with the example and as shown in FIG. 4, suppose that the SP 40(A) has started three WUT operations 90(1), 90(2), 90(3) (collectively, WUT operations 90) using a particular token, i.e., token #5 which is used to identify particular host data X for copying by WUT operations. FIG. 4 shows WUT operation 90(1) copying the particular host data X from source storage location 92 to destination storage location 94(1). FIG. 4 further shows WUT operation 90(2) copying the particular host data X from source storage location 92 to destination storage location 94(2), and WUT operation 90(3) copying the particular host data X from source storage location 92 to destination storage location 94(3).

FIG. 5 shows particular details of the token database 74(A) of the SP 40(A), and particular details of the token database 74(B) of the SP 40(B). Also shown in FIG. 5 is a double arrow 130 representing messages 130 between the SPs 40 to share token state information.

In connection with the token database 74(A), the entry 102(A)(5) indicates that there are three (3) WUT operations 90 currently in progress on the SP 40(A) using token #5. Also, the entry 102(A)(5) indicates, among other things, that (i) the last update for token #5 was at time 10:44:38, (ii) token #5 is "busy" from the perspective of the SP 40(A) (i.e., the number of WUT operations currently in progress on SP 40(A) is greater than zero), and (iii) token #5 is "idle" from the perspective of the SP 40(B) (i.e., the number of WUT operations currently in progress on SP 40(B) is zero).

In connection with the token database 74(B) (see FIG. 5), the entry 102(B)(5) indicates that there are no WUT operations currently in progress on SP 40(B) using token #5. Additionally, the entry 102(B)(5) indicates, among other things, that the last update for token #5 was at time 10:44:38, and that token #5 is "busy" from the perspective of the SP 40(A) (due to update messages 130 sent from the SP 40(A) to the SP 40(B) to update token state information between the SPs 40). Also, the entry 102(B)(5) indicates that the token #5 is "idle" from the perspective of the SP 40(B) since the number of WUT operations currently in progress on SP 40(B) is zero.

Now, recall that each SP 40 has an expiration checker (e.g., the processing circuitry 64 of that SP 40 executing certain instructions 72, also see FIG. 2) which scans the token database 74 in order to reclaim SP resources for reuse. The expiration checker can immediately disregard all entries 102 of the token database 74 for tokens which have been touched within the predefined expiration time (e.g., within the last five seconds) or which have a tally of WUT operations currently in progress which is greater than zero. However, for entries 102 for tokens which (i) have not been touched for at least the predefined expiration time and (ii) have a tally of WUT operations currently in progress on the SP 40 which is not greater than zero, the expiration checker further evaluates the entries 102 for possible token expiration by inspecting token states (also see the token state fields 116 in FIG. 3).

Along these lines, suppose that the expiration checker of the SP 40(A) (i.e., the processing circuitry 64 of the SP 40(A) executing certain instructions 72, also see FIG. 2) scans the token database 74(A) in order to reclaim resources for SP 40(A). Further suppose that the delta between current time and the timestamp in entry 102(A)(5) for token #5 is greater than the predefined expiration time. The expiration checker will not expire token #5 because there is at least one WUT operation currently in progress on SP 40(A). That is, the contents of the WUT counter field (i.e., the number of WUT operations currently in progress) is greater than zero (i.e., three). Additionally, there is at least one token state field in the entry 102(A)(5) indicating that token #5 is still "busy". Specifically, the token state field containing the token state from the perspective of the SP 40(A) hold a "busy" value.

Additionally, suppose that the expiration checker of the SP 40(B) scans the token database 74(B) in order to reclaim resources for SP 40(B). The expiration checker may determine that (i) token #5 has not been touched for at least the predefined amount of time and (ii) the tally of WUT operations currently in progress on SP 40(B) using token #5 is zero. In this situation, the expiration checker of the SP 40(B) further evaluates the entry 102(B)(5) for possible expiration. In particular, the expiration checker of the SP 40(B) inspects the token state fields of the entry 102(B)(5) to determine whether the token is "busy" on any of the SPs 40. In this situation, the entry 102(B)(5) indicates that token #5 is "idle" from the perspective of the SP 40(B), but is "busy" from the perspective of the SP 40(A). Since the token states in the entry 102(B)(5) indicate that token #5 is busy on at least one SP 40, the expiration checker does not expire token #5.

It should be understood that the expiration checkers routinely scan the token databases 74 (e.g., periodically, in the background as a low priority activity, etc.). Such operation enables the SPs 40 to smartly prevent token expiration even when the predefined amount of time for token expiration has passed but when there is a WUT operation still in progress on at least one SP 40. Accordingly, the data storage array 24 is able to perform WUT operations which copy large amounts of data (e.g., copying virtual machine images, large file systems, large volumes, etc.). For example, such management of token states is well suited for data transfer operations involving relatively large files and taking relatively long amounts of time to complete such as moving virtual disk images, copying large volumes or container files, and so on.

It should be further understood that, although token expiration was avoided in this situation, the SPs 40 still possess the ability to abort WUT operations using token #5 for other reasons, e.g., due to modification of the host data X at the source storage location 92.

As time passes, all of the WUT operations using token #5 on all of the SPs 40 may complete successfully. During this time, the SPs 40 may communicate their token states to each other using the update messages 130, and update the entries 102 in their respective token databases 74 to reflect successful completion. While this happens, the expiration checkers of each SP 40 continue to scan the token databases 74 to reclaim SP resources. Eventually, the expiration check on one of the SPs 40 may see that not only has the predefined expiration amount of time passed, but also the token state for token #5 is "idle" on each SP 40. Upon such detection, the detecting SP 40 will invalidate token #5 locally, and send out an update message directing any other SP 40 to invalidate token #5 as well. Further details will now be provided with reference to FIGS. 6 and 7.

Figure 6:
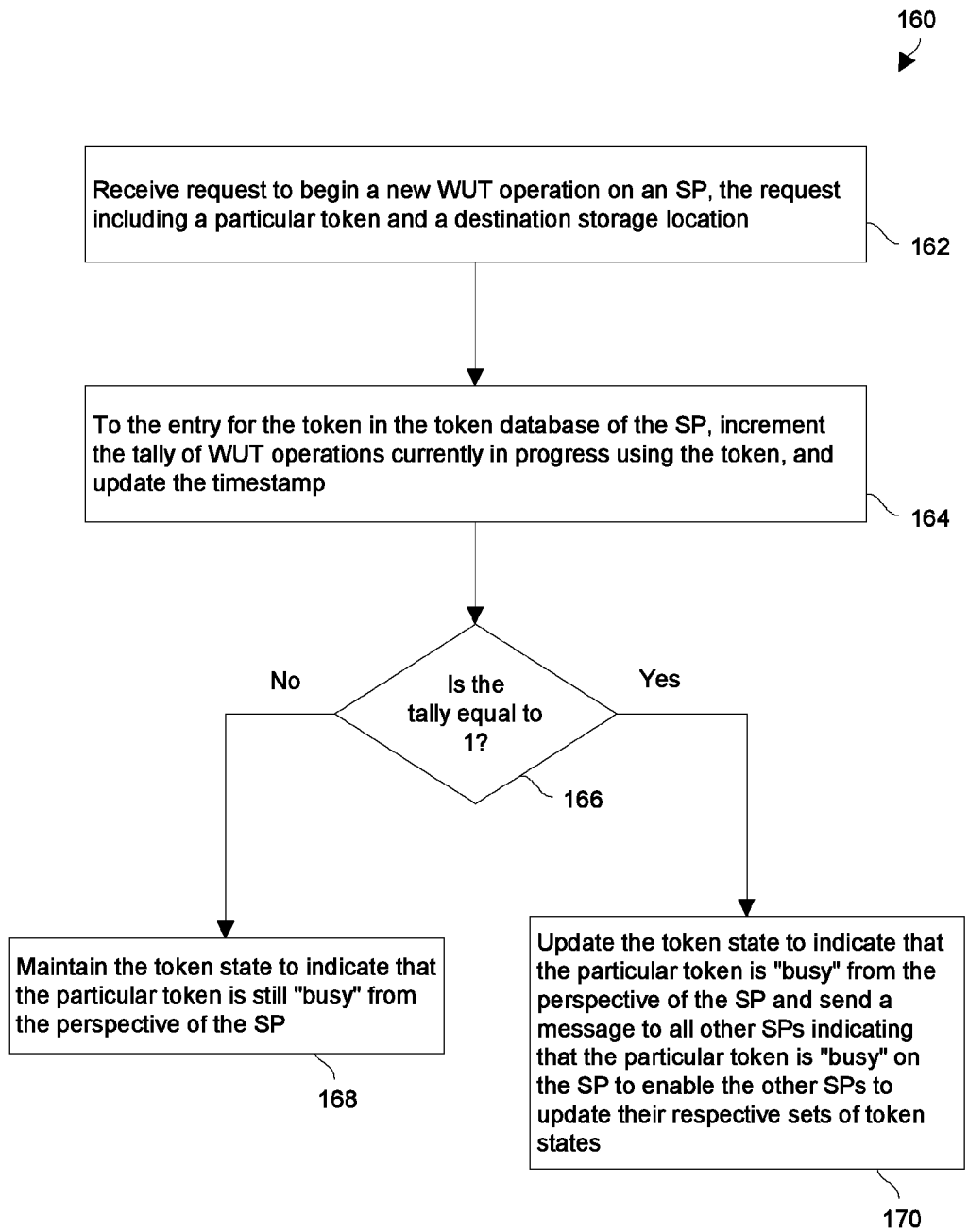
FIG. 6 is a flowchart of a procedure which is performed by an SP when starting a WUT operation.
Figure 7:
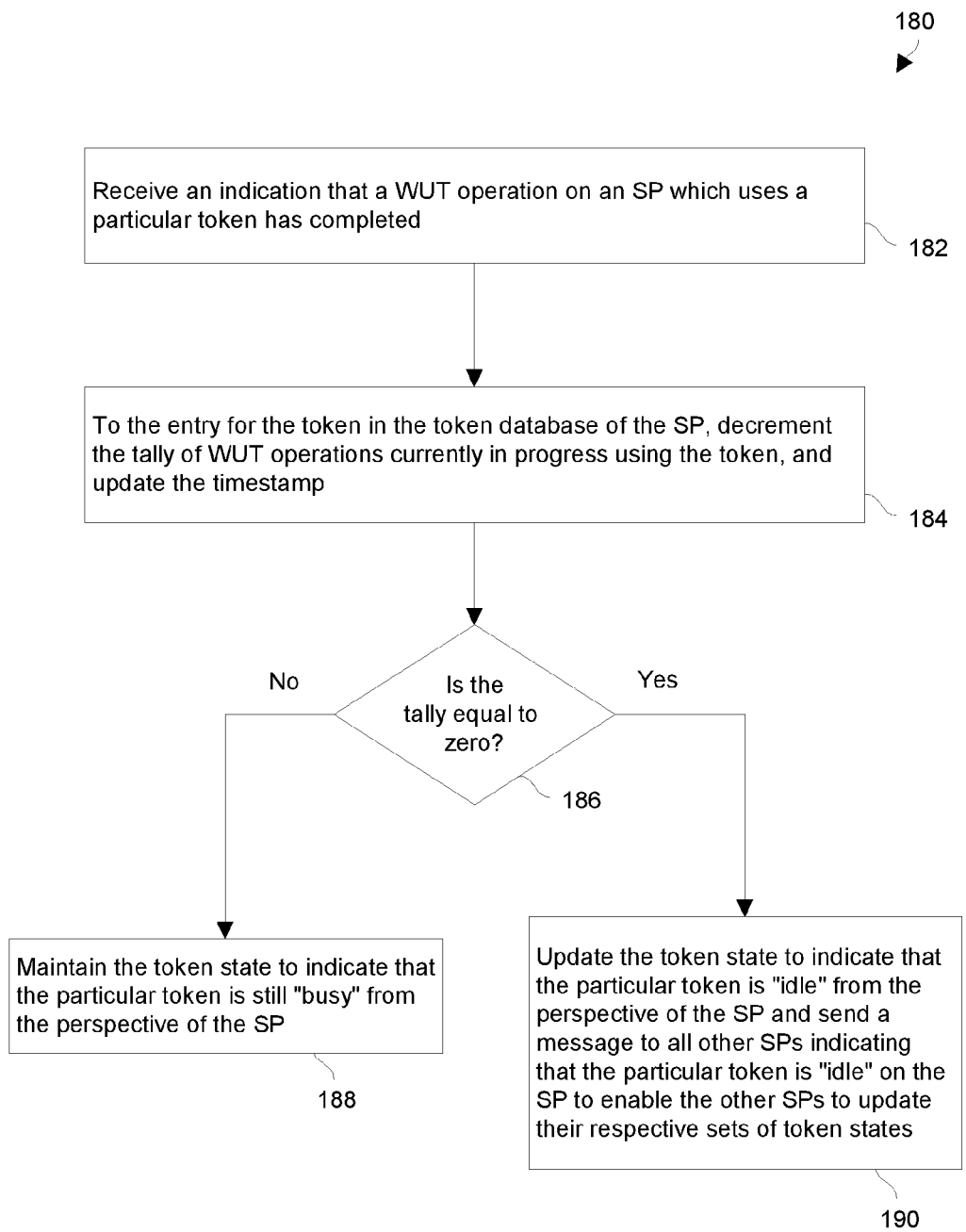
FIG. 7 is a flowchart of a procedure which is performed by an SP when completing a WUT operation.

FIGS. 6 and 7 show flowcharts of procedures for handling certain situations. In particular, FIG. 6 shows a flowchart of a procedure 160 which is performed by an SP 40 when starting a new WUT operation. FIG. 7 shows a flowchart of a procedure 180 which is performed by an SP 40 when completing an existing WUT operation.

With reference to the procedure 160 in FIG. 6, an SP 40 may receive a request to begin a new WUT operation in which data is to be copied from a source storage location to a destination storage location without buffering the data at a host (also see FIG. 4). In step 162, the SP 40 receives the request to begin the new WUT operation on the SP 40. As mentioned earlier, the request includes a particular token which identifies the data and the destination storage location.

In step 164, the SP 40 finds the entry 102 for the particular token in the token database 74 (also see FIG. 3). The SP 40 then increments the count field (i.e., a counter) containing the tally of WUT operations currently in progress using the particular token. Additionally, the SP 40 updates other information in the entry 102 such as the timestamp indicating when the particular token was last touched.

In step 166, the SP 40 determines, after the tally of WUT operations is incremented, whether the tally of WUT operations equals 1. If not (i.e., "no"), step 166 proceeds to step 168. Otherwise (i.e., "yes"), step 166 proceeds to step 170.

In step 168, the SP 40 simply maintains or confirms that the appropriate token state of the entry 102 indicates that the particular token is still "busy" from the perspective of the SP 40. That is, since the tally was already at least 1 prior to step 164 and is now greater than 1, the appropriate token state already indicates that the particular token is "busy" from the perspective of the SP 40 so the token state does not need to be modified.

However, in step 170, since the tally was zero prior to step 164 and is now equal to 1, the appropriate token state indicated that the particular token was "idle" from the perspective of the SP 40 and the token state thus needs to be updated to "busy" by the SP 40. Accordingly, the SP 40 changes the appropriate token state to "busy". Additionally, the SP 40 sends a update message 130 (FIG. 5) to all of the other SPs 40 indicating that the particular token is now "busy" on that SP 40. Upon receipt of the update message 130, the other SPs 40 are then able to update their respective sets of token states. In particular, each of the other SPs 40 finds the same entry 102 in its respective token database 74, updates the timestamp to indicate that the token has been touched and changes the appropriate token state from "idle" to "busy" to indicate that the particular token is "busy" from the perspective of the SP 40 performing the new WUT operation.

It should be understood that there is no need to send updates to the other SPs 40 when the tally is already at least 1 and then incremented (see step 168). Rather, the other SPs 40 already consider the particular token to be "busy" on the SP 40 and not sending unnecessary updates alleviates the need for the SP to consume extra SP resources and minimizes traffic between SPs 40.

With reference to the procedure 180 in FIG. 6, an SP 40 completes an existing WUT operation and needs to update itself and perhaps other SPs 40 regarding such status. In step 182, the SP 40 receives an indication that an existing WUT operation has completed on the SP 40. The indication includes a particular token which was used to identify the copied data.

In step 184, the SP 40 finds the entry 102 for the particular token in the token database 74. The SP 40 then decrements the count field containing the tally of WUT operations currently in progress which use the particular token. Additionally, the SP 40 updates other information in the entry 102 such as the timestamp indicating when the particular token was last touched.

In step 186, the SP 40 determines, after the tally of WUT operations is decremented, whether the tally of WUT operations equals zero. If not (i.e., "no"), step 186 proceeds to step 188. Otherwise (i.e., "yes"), step 186 proceeds to step 190.

In step 188, the SP 40 simply maintains or confirms that the appropriate token state of the entry 102 indicates that the particular token is still "busy" from the perspective of the SP 40. That is, since the tally is not equal to zero it must still be greater than zero meaning there is at least one WUT operation which is currently in progress on the SP 40 which uses the particular token.

However, in step 190, the SP 40 updates the appropriate token state of the entry 102 to indicate that the particular token is now "idle" from the perspective of the SP 40. That is, if the tally is now zero, there are no other WUT operations currently in progress on the SP 40 which use the particular token.

Additionally, in step 190, the SP 40 sends an update message 130 to all of the other SPs 40 indicating that the particular token is "idle" on that SP 40. Upon receipt of the update message 130, the other SPs 40 are then able to update their respective sets of token states. In particular, each of the other SPs 40 finds the same entry 102 in its respective token database 74 (e.g., see entries 102(A)(5) and 102(B)(5) in FIG. 5), updates the timestamp to indicate that the token has been touched, and changes the appropriate token state from "busy" to "idle" to indicate that the particular token is now "idle" from the perspective of the SP 40 that completed the WUT operation.

It should be understood that there is no need to send updates to the other SPs 40 when the tally is decremented but is still greater than zero (see step 188). Rather, the other SPs 40 already consider the particular token to be "busy" on the SP 40 and not sending unnecessary updates alleviates the need for the SP to consume extra SP resources and minimizes traffic between SPs 40. Further details will now be provided with reference to FIG. 8.

Figure 8:
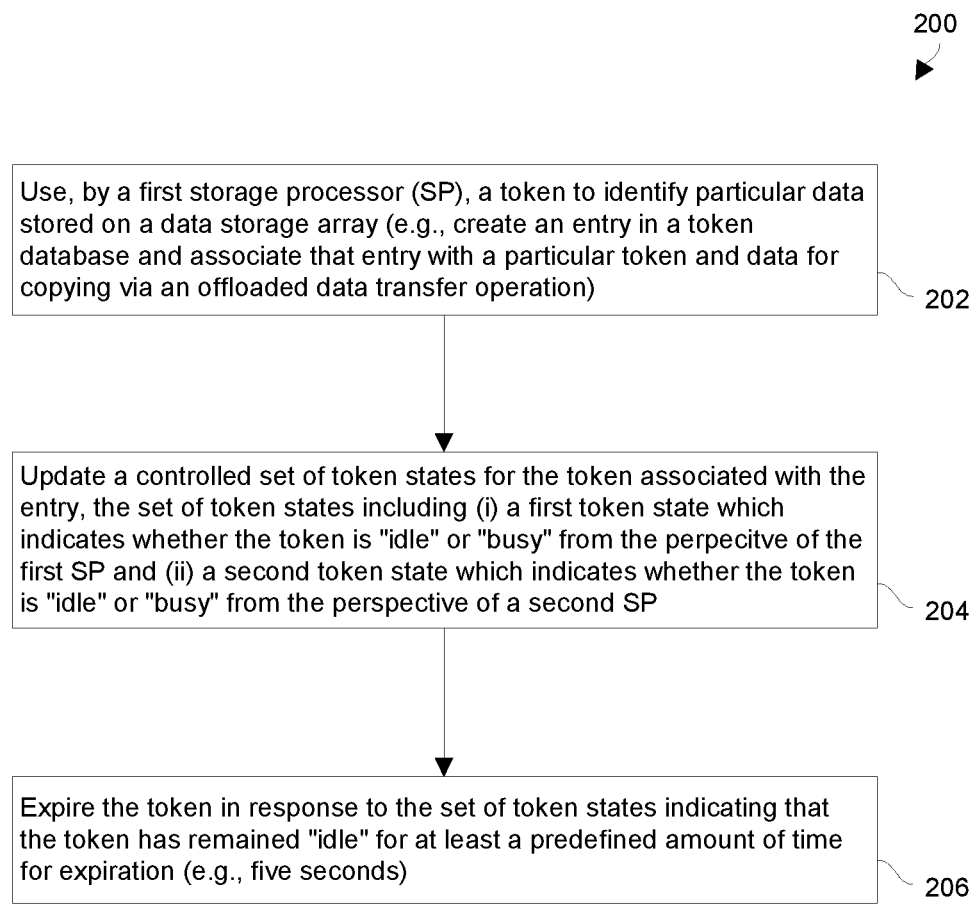
FIG. 8 is a flowchart of a procedure which is performed by the data storage array when managing token states.

FIG. 8 shows a flowchart of a procedure 200 which is performed by an SP 40 to manage token states across multiple SPs 40 of a data storage array 24.

In step 202, the SP 40 uses a token to identify particular data stored on the data storage array 24. For example, the SP 40 may create an entry 102 in the token database 74 and associate that entry 102 with a particular token and particular data for copying via offloaded data transfer operations. Such activity may occur in response to a PT request from a host 22.

In step 204, the SP 40 updates, as a first SP-controlled set of token states for the token associated with the entry 102. As mentioned earlier, the entry 102 includes, among other things, (i) a first token state which indicates whether the token is "idle" or "busy" from a perspective of the first SP and (ii) a second token state which indicates whether the token is "idle" or "busy" from a perspective of a second SP of the data storage array (also see FIGS. 3 and 5). Such activity may occur in response to local operations started and completed on the first SP as well as in response to update messages from one or more other SPs.

In step 206, the SP 40 eventually expires the token in response to the first SP-controlled set of token states indicating that the token has remained "idle" for at least a predefined token expiration time. For example, an expiration checker of the SP 40 may determine that the timestamp of the entry 102 for that token is older than the predefined expiration time, and that all of the token states indicate that the token is "idle". Accordingly, the SP 40 invalidates the token locally in the token database 74. Additionally, the SP 40 sends an update message to all of the other SPs 40 of the data storage array 24 to direct all of the other SPs 40 to invalidate the token as well.

When another SP receives an update message directing it to invalidate a token, the other SP terminates any WUT operations currently in progress that use that token. Additionally, the other SP updates its token database 74 to destroy the token.

As described above, each SP 40 of the data storage array 24 may maintain, for each token, a timestamp to determine whether the predefined amount of time for token expiration has passed. In order for the SPs 40 to maintain synchronized timestamps and thus synchronized token expiration times, the SPs 40 exchange "touch" messages for tokens in response to WUT operations (also see messages 130 in FIG. 5). In particular, when an SP 40 initiates a WUT operation which uses a particular token, the SP 40 updates its local timestamp for that token and sends a "touch" message for that token to the other SPs 40.

Moreover, if multiple simultaneous WUT operations for the same token occur on an SP 40, the SP 40 needs to send only a single "touch" message (or an update timestamp message which directs the receiving SP 40 to update the timestamp for the token with the current time) for just one of the simultaneous WUT operations rather than a "touch" message for each WUT operation. Such optimized peer messaging activity not only keeps the token's expiration time synchronized across the SPs, but also reduces messaging traffic between SPs 40 and frees SP resources for use in other operations.

Figure 9:
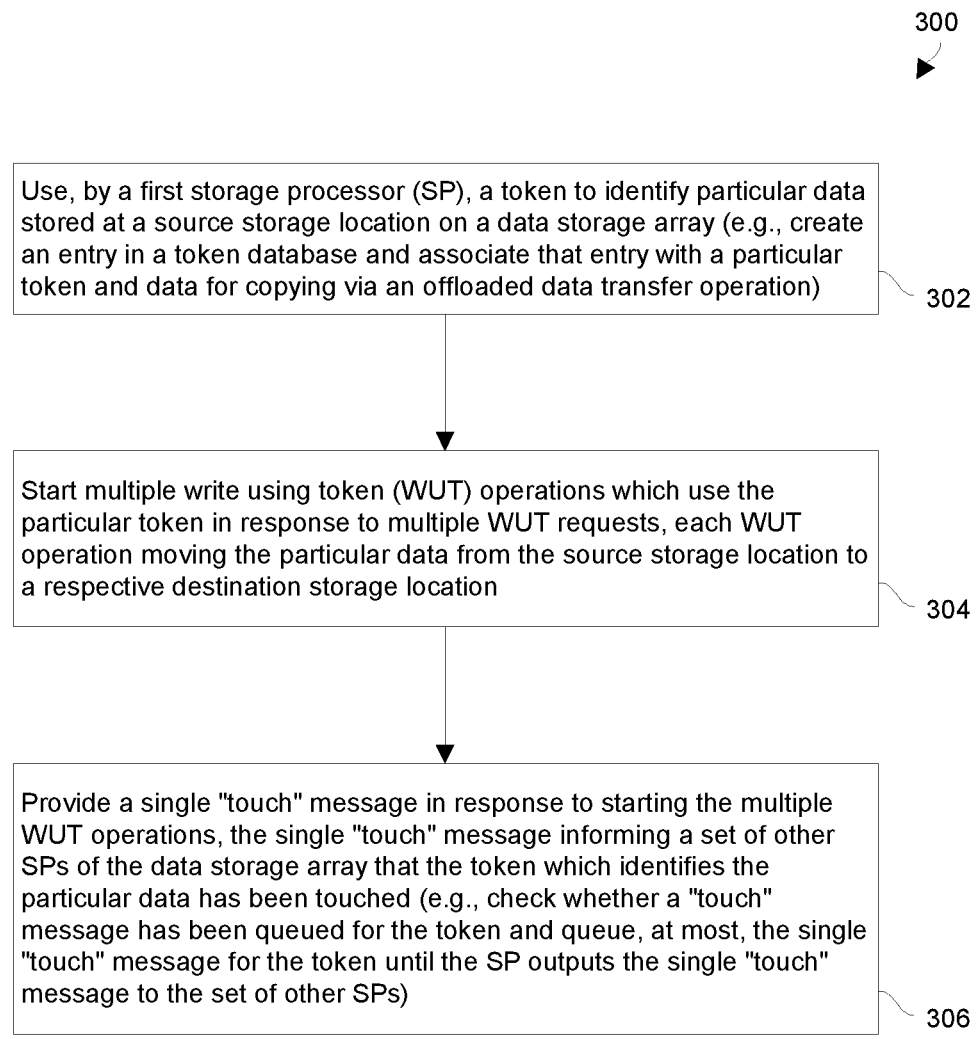
FIG. 9 is a flowchart of a procedure which is performed by an SP in connection with synchronizing a token's expiration time, i.e., peer messaging.

FIG. 9 is a flowchart of a procedure 300 which is performed by an SP 40 in connection with peer messaging across multiple SPs to synchronize a token's expiration time. In step 302, the SP 40 uses a token to identify particular data stored at a source storage location on a data storage array. As mentioned earlier, the SP 40 may create an entry 102 in the token database 74 and associate that entry 102 (also see FIG. 3) with a particular token and particular data for copying via offloaded data transfer operations. Such activity may occur in response to a PT request from a host 22.

In step 304, the SP 40 starts multiple write using token (WUT) operations which use the token in response to multiple WUT requests, each WUT operation moving the particular data from the source storage location to a respective destination storage location. As an example, in a virtual machine environment, multiple copies of a virtual machine image may be simultaneously deployed to instantiate multiple virtual machines. Such initiation of multiple WUT operations may occur at substantially the same time (within one or two seconds) or within a very short period of time (within a few seconds, within five seconds, etc.) before the SP 40 is able to send out any update messages 130 to notify other SPs 40 (also FIG. 5).

In step 306, the SP 40 provides a single "touch" message in response to starting the multiple WUT operations, the single "touch" message informing a set of other SPs 40 of the data storage array 24 that the particular token which identifies the particular data has been touched. In this manner, the SP 40 is able to maintain synchronization of token expiration time, i.e., the SP 40 updates its local timestamp for the token and the set of other SPs 40 update their respective timestamps for the token in response to the single "touch" message. In some arrangements, the SP 40 checks whether a "touch" message has already been queued for the token and queues, at most, the single "touch" message for the token until the SP outputs the single "touch" message to the set of other SPs 40.

It should be understood that once the SP 40 outputs the single "touch" message to the set of other SPs 40, the SP 40 may start another WUT operation which uses the particular token. In this situation, the SP 40 may queue another "touch" message and send that other "touch" message to the set of other SPs 40 thus maintaining synchronization of the token's expiration time when a subsequent WUT operation is initiated by the SP 40.

It should be further understood that the SP 40 can also update its local timestamp for the particular token in response to messages from the set of other SPs 40. For example, if the SP 40 receives a "touch" message for the token from another SP 40, the SP updates its local timestamp. Such operation maintains token expiration synchronization across the SPs 40. Further details will now be provided with reference to FIG. 10.

Figure 10:
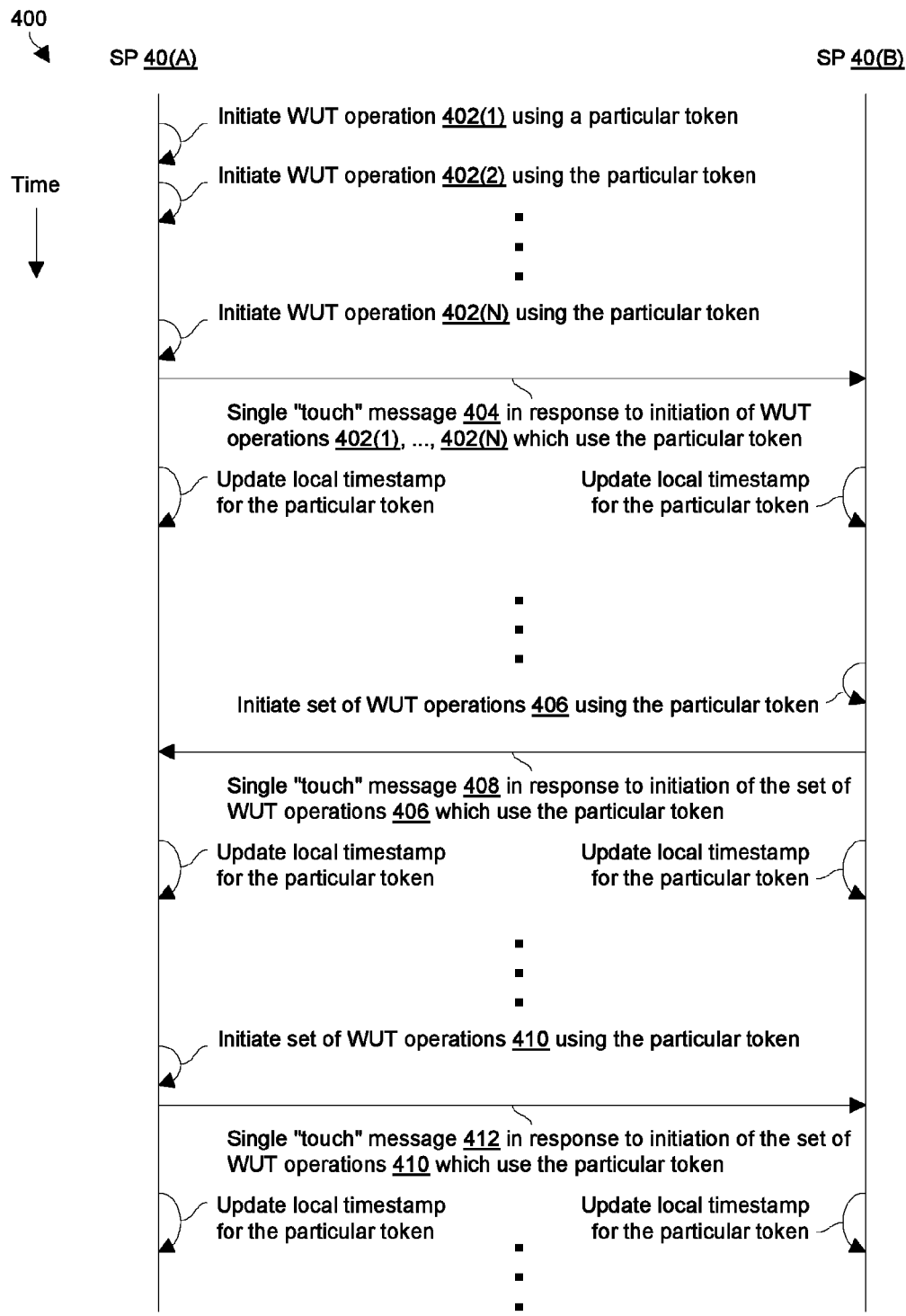
FIG. 10 is a sequence diagram of a peer messaging example to keep a token's expiration time synchronized across SPs.

FIG. 10 is a sequence diagram 400 showing certain operations which are performed by the SPs 40 of a data storage array 24. By way of example, the data storage array 24 includes exactly two SPs 40(A), 40(B) (collectively, SPs 40). Time flows in the negative Y-direction.

Suppose that each SP 40 has already created an entry 102 in its local token database 74 for a particular token (also see FIGS. 2 and 3). At this point, each SP 40 may start one or more WUT operations to move the particular data between source and destination storage locations (also see FIG. 4).

Accordingly and as shown by way of example in FIG. 10, the SP 40(A) starts multiple WUT operations 402(1), . . . 402(N) using the particular token. In response to each WUT operation 402(1), . . . 402(N), the SP 40(A) readies itself to send a "touch" message to the remaining SPs 40 of the data storage array 24 (in this case, to the SP 40(B)). It should be understood that the SP 40(A) may initiate the WUT operations 402(1), . . . 402(N) substantially at the same time or so quickly (e.g., within a few seconds) that the SP 40(A) has not yet had a chance to empty its messaging queue (see additional memory constructs 76 in FIG. 2) and output the "touch" message to the other SP 40(B). In such a situation, the SP 40(A) does not need to queue and send multiple "touch" messages to the other SP 40(B). Rather, the SP 40(A) simply queues and sends a single "touch" message 404 to the other SP 40(B).

As the SP 40(A) outputs the single "touch" message 404, the SP 40(A) updates its local timestamp for the particular token. Likewise, the SP 40(B) updates its local timestamp for the particular token in response to the single "touch" message 404. Accordingly, the token expiration time is synchronized across the SPs 40. Since only the single "touch" message 404 rather than multiple "touch" messages, bandwidth and SP resources that would have otherwise been consumed by the multiple "touch" messages is saved.

After the SP 40(A) has outputted the single "touch" message 404 for the particular token, it should be understood that further events may occur which cause outputting of further "touch" messages for the particular token. For example, as shown in FIG. 10, the SP 40(B) may initiate a set of WUT operations 406 (i.e., one or more WUT operations) using the particular token. Moreover, if such initiation occurs around the same time and before the SP 40(B) has been able to output any "touch" message, the SP 40(B) can output a single "touch" message 408 to the SP 40(A). As the SP 40(B) outputs the single "touch" message 408, the SP 40(B) updates its local timestamp for the particular token. Similarly, the SP 40(A) updates its local timestamp for the particular token in response to the single "touch" message 408. As a result, the expiration time for the particular token remains synchronized across the SPs 40. Again, since only the single "touch" message 408 rather than multiple "touch" messages were sent by the SP 40(B), bandwidth and SP resources that would have otherwise been consumed by the multiple "touch" messages is saved.

By way of example, FIG. 10 further shows that the SP 40(A) is capable of sending yet another "touch" message 410 after sending the first "touch" message 404. In particular, as the SP 40(A) starts additional WUT operations, the SP 40(A) optimally notifies the SP 40(B) by queuing at most a single "touch" message and then outputting that "touch" message, and vice versa. Accordingly, in each situation, the SPs 40 are able optimize the updating mechanism to reduce messaging traffic between SPs and thus reduce I/O latency as some WUT operations require no messaging.

While various embodiments of the present disclosure have been particularly shown and described, it will be understood by those skilled in the art that various changes in form and details may be made therein without departing from the spirit and scope of the present disclosure as defined by the appended claims.

For example, it should be understood that, in the example of FIGS. 4 and 5, the data storage array 24 was described as including only two SPs 40 for simplicity. However, in other arrangements, the data storage array 24 includes a different number of SPs 40 (e.g., three, four, eight, sixteen, multiple virtual SPs, etc.). Moreover, in some arrangements, management of token states is extended across multiple data storage arrays 24, i.e., SPs 40 of multiple data storage arrays 24 share token state information to coordinate token expiration, etc.

Additionally, if the data storage array 24 includes more than two SPs 40 which connect to a shared communications channel (e.g., a shared bus), each SP 40 may send just a single "touch" message for a token on the shared communications channel to notify all of the remaining SPs 40 at once (e.g., in the manner of a broadcast). Alternatively, if the SPs 40 have non-shared communications channels (e.g., point-to-point communications), each SP 40 may send respective copies of the single "touch" message for the token to notify all of the remaining SPs 40 at once.

Furthermore, it should be understood that each SP 40 may update its local timestamp in response to the "touch" messages it sends out. However, in some arrangements, each SP 40 is equipped with a token driver thus providing flexibility as to when the SP 40 updates its local timestamp (e.g., upon receipt of a WUT request, in response to each starting of a WUT operation, and so on). Such modifications and enhancements are intended to belong to various embodiments of the disclosure.

What is claimed is:

1. A method of peer messaging across multiple storage processors (SPs) of a data storage array, the method comprising:

using a token, by a first SP of the data storage array, to identify particular data stored at a source storage location on the data storage array;

starting, by the first SP, multiple write using token (WUT) operations which use the token in response to multiple WUT requests, each WUT operation moving the particular data from the source storage location to a respective destination storage location; and providing, by the first SP, a single "touch" message in response to starting the multiple WUT operations by the first SP, the single "touch" message informing a set of other SPs of the data storage array that the token which identifies the particular data has been touched.

2. A method as in claim 1 wherein starting the multiple WUT operations which use the token in response to the multiple WUT requests includes:

initiating the multiple WUT operations within a period of time in which the single "touch" message has been queued for output to the set of other SPs by the first SP but not yet outputted by the first SP.

3. A method as in claim 2 wherein providing the single "touch" message in response to starting the multiple WUT operations includes:

after the period of time, outputting the single "touch" message to the set of other SPs.

4. A method as in claim 2, further comprising:
in response to initiation of a first WUT operation of the multiple WUT operations which use the token, (i) checking whether a "touch" message for the token has been queued for transmission by the first SP and (ii) due to absence of any queued "touch" message for the token, queuing the single "touch" message on behalf of the first WUT operation for transmission by the first SP.

5. A method as in claim 4, further comprising:
after queuing the single "touch" message for transmission by the first SP and in response to initiation of a set of other WUT operations of the multiple WUT operations which use the token, (i) checking whether a "touch" message for the token has been queued for transmission by the first SP and (ii) due to presence of the queued single "touch" message, not queuing further "touch" messages on behalf of the set of other WUT operations of the multiple WUT operations which use the token.

6. A method as in claim 2 wherein providing the single "touch" message in response to starting the multiple WUT operations includes:
after outputting the single "touch" message to the set of other SPs, starting, by the first SP, another WUT operation which uses the token in response to another WUT request to move the particular data from the source storage location to another destination storage location; and
providing, by the first SP, another "touch" message in response to starting the other WUT operation, the other "touch" message informing the set of other SPs of the data storage array that the token which identifies the particular data has been touched again.

7. A method as in claim 1 wherein the data storage array includes a set of non-volatile data storage units to store host data on behalf of a set of host computers, the host data including the particular data identified using the token; and wherein the method further comprises:
performing, by the first SP and the set of other SPs, host input/output (I/O) operations on the particular data in response to host I/O requests from the set of host computers.

8. A method as in claim 7, further comprising:
updating, by the first SP, a local timestamp for the token in response to the single "touch" message.

9. A method as in claim 8, further comprising:
updating, by the first SP, the local timestamp for the token in response to a "touch" message from a second SP of the data storage system.

10. A method as in claim 7, further comprising:
updating, by each SP of the set of other SPs, a respective timestamp for the token in response to the single "touch" message provided by the first SP in response to starting the multiple WUT operations by the first SP.

11. A storage processing apparatus, comprising:
a host interface to communicate with a set of host computers;
a storage interface to communicate with a set of non-volatile data storage units which stores host data on behalf of the set of host computers; and
control circuitry coupled to the host interface and the storage interface, the control circuitry being constructed and arranged to:
use a token to identify particular data stored at a source storage location on the data storage array,
start multiple write using token (WUT) operations which use the token in response to multiple WUT requests, each WUT operation moving the particular data from the source storage location to a respective destination storage location, and
provide a single "touch" message in response to starting the multiple WUT operations by the first SP, the single "touch" message informing a set of other SPs of the data storage array that the token which identifies the particular data has been touched.

12. A storage processing apparatus as in claim 11 wherein the control circuitry, when starting the multiple WUT operations which use the token in response to the multiple WUT requests, is constructed and arranged to:
initiate the multiple WUT operations within a period of time in which the single "touch" message has been queued for output to the set of other SPs by the first SP but not yet outputted by the first SP.

13. A storage processing apparatus as in claim 12 wherein the control circuitry, when providing the single "touch" message in response to starting the multiple WUT operations, is constructed and arranged to:
after the period of time, output the single "touch" message to the set of other SPs.

14. A storage processing apparatus as in claim 12 wherein the control circuitry is further constructed and arranged to:
in response to initiation of a first WUT operation of the multiple WUT operations which use the token, (i) check whether a "touch" message for the token has been queued for transmission by the first SP and (ii) due to absence of any queued "touch" message for the token, queue the single "touch" message on behalf of the first WUT operation for transmission by the first SP.

15. A storage processing apparatus as in claim 12 wherein the control circuitry, when providing the single "touch" message in response to starting the multiple WUT operations, is constructed and arranged to:
after outputting the single "touch" message to the set of other SPs, start another WUT operation which uses the token in response to another WUT request to move the particular data from the source storage location to another destination storage location, and
provide another "touch" message in response to starting the other WUT operation, the other "touch" message informing the set of other SPs of the data storage array that the token which identifies the particular data has been touched again.

16. A computer program product having a non-transitory computer readable medium which stores a set of instructions to perform peer messaging across multiple storage processors (SPs) of a data storage array, the set of instructions, when carried out by a first SP of the data storage array, causing the first SP to perform a method of:
using a token to identify particular data stored at a source storage location on the data storage array;
starting multiple write using token (WUT) operations which use the token in response to multiple WUT requests, each WUT operation moving the particular data from the source storage location to a respective destination storage location; and
providing a single "touch" message in response to starting the multiple WUT operations by the first SP, the single "touch" message informing a set of other SPs of the data storage array that the token which identifies the particular data has been touched.

17. A computer program product as in claim 16 wherein starting the multiple WUT operations which use the token in response to the multiple WUT requests includes:

initiating the multiple WUT operations within a period of time in which the single "touch" message has been queued for output to the set of other SPs by the first SP but not yet outputted by the first SP.

18. A computer program product as in claim 17 wherein providing the single "touch" message in response to starting the multiple WUT operations includes:

after the period of time, outputting the single "touch" message to the set of other SPs.

19. A computer program product as in claim 17 wherein the method further comprises:

in response to initiation of a first WUT operation of the multiple WUT operations which use the token, (i) checking whether a "touch" message for the token has been queued for transmission by the first SP and (ii) due to absence of any queued "touch" message for the token, queuing the single "touch" message on behalf of the first WUT operation for transmission by the first SP.

20. A computer program product as in claim 17 wherein providing the single "touch" message in response to starting the multiple WUT operations includes:

after outputting the single "touch" message to the set of other SPs, starting, by the first SP, another WUT operation which uses the token in response to another WUT request to move the particular data from the source storage location to another destination storage location; and providing, by the first SP, another "touch" message in response to starting the other WUT operation, the other "touch" message informing the set of other SPs of the data storage array that the token which identifies the particular data has been touched again.

\* \* \* \* \*